United States Patent
Ludvik et al.

[15] 3,692,915
[45] Sept. 19, 1972

[54] COMPOSITIONS AND METHODS FOR COMBATTING INSECTS OF THE GENUS HELIOTHIS

[72] Inventors: George F. Ludvik, Kirkwood, Mo. 63122; Walter A. Darlington, Brentwood, Mo. 63144

[73] Assignee: Monsanto Company, St. Louis, Mo.

[22] Filed: May 13, 1970

[21] Appl. No.: 37,026

[52] U.S. Cl. ................................ 424/352, 424/354
[51] Int. Cl. ........................... A01n 9/30, A01n 9/34
[58] Field of Search ........................... 424/352, 354

[56] References Cited

UNITED STATES PATENTS 2,565,471  8/1951  Buntin ..................... 424/352
3,285,811  11/1966  Wiles ....................... 424/354

Primary Examiner—Albert T. Meyers
Assistant Examiner—Leonard Schenkman
Attorney—Neal E. Willis, Paul C. Krizov and Albert J. Greene

[57] ABSTRACT

Mixtures for combating insect species of the genus Heliothis comprising 1,1-dichloro-2,2-bis(4'-chlorophenyl) cyclopropane and a polychloro bicyclic terpene characterized by a combined chlorine content of from about 60 percent to about 72 percent by weight.

5 Claims, No Drawings

COMPOSITIONS AND METHODS FOR COMBATTING INSECTS OF THE GENUS HELIOTHIS

This invention relates to mixtures for combating insect species of the genus Heliothis comprising 1,1-dichloro-2,2-bis(4'-chlorophenyl) cyclopropane and a polychloro bicyclic terpene characterized by a combined chlorine content of from about 60 percent to about 72 percent by weight.

The aforesaid compound 1,1-dichloro-2,2-bis(4'-chlorophenyl) cyclopropane

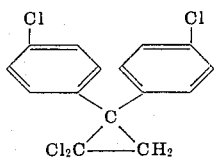

of this invention and its preparation are described in U.S. Pat. No. 3,285,811.

The aforesaid polychloro bicyclic terpene of this invention includes polychloro camphene, polychloro camphene hydrochloride, polychloro isocamphane, and mixtures thereof, which are described in U.S. Pat. No. 2,565,471, as is the method of their preparation. Therein is shown that bicyclic terpenes of the group camphene, camphene hydrochloride, isocamphane, and mixtures thereof, are chlorinated with gaseous chlorine at an elevated temperature to provide a particular group having a combined chlorine content of from about 60 percent to about 72 percent by weight, that said temperature of chlorinating being below that at which the ultimate polychloro bicyclic terpene decomposes. Of this group of polychloro bicyclic terpenes of this invention polychloro camphene is preferred, which latter preferably is characterized by a combined chlorine content of from about 67 percent to about 69 percent by weight (this weight of chlorine corresponds to about eight atoms of chlorine per mol of polychloro camphene).

The insect larvae species of the genus Heliothis are well known to be highly destructive to a wide variety of vegetation during its active growth stage, particularly causing considerable damage to the fruit (i.e., simple, as pods, bolls, capsules, squares, blooms, etc., aggregate, or collective), and leaves or foliage thereof. The larvae of the species *Heliothis zea* and *armigera* are known to be destructive to some 80 or more growing plant species and in particular corn, cotton and tomato in their various growth stages, hence the common names therefor "corn earworm," "cotton bollworm" and "tomato fruitworm." The larvae of the species *Heliothis virescens*, which is commonly termed "tobacco budworm," are also a well known pest in growing tobacco and cotton crop fields.

In accordance with this invention it has been found that insect species of the genus Heliothis are successfully combatted by contacting the larval stage thereof by way of applying to same and their habitat (i.e., the host environment of the larvae) an insecticidal amount of a mixture of aforedescribed 1,1-dichloro-2,2-bis(4'-chlorophenyl)cyclopropane and a polychloro bicyclic terpene aforedescribed in a weight ratio of 1:2 to 8, (that is one part of the cyclopropane compound per 2 to 8 parts of the terpene compound), but preferably a weight ratio of about 1:2.5 to 5. This combination of compounds of this invention will hereinafter be referred to as "mixtures" or "mixture" unless otherwise modified.

Although the mixtures of this invention are useful per se in combating Heliothis larvae, it is preferable that they be supplied to the larvae or to the environment or host of the larvae in a dispersed form in a suitable extending agent. The exact concentration of the various mixtures of this invention employed in destroying said larvae can vary considerably provided the required dosage (i.e., toxic or insecticidal amount) thereof is supplied to the larvae or to the environment or host of the larvae. When the extending agent is a liquid or mixture of liquids (e.g., as in solutions, suspensions, emulsions, or aerosols) the concentration of the mixture employed to supply the desired dosage generally will be in the range of 0.001 to 95 percent by weight. When the extending agent is a semi-solid or solid, the concentration of the mixture employed to supply the desired dosage generally will be in the range of 0.1 to 75 percent by weight. From a practical point of view, the manufacturer must supply the user with a low cost concentrate or spray base or particulate solid base in such form that, by merely mixing with water or finely divided inert solid extender (e.g., powdered clay or talc) or other low cost material available to the user at the point of use, he will have an easily prepared insecticidal spray or particulate solid. In such a concentrate composition, the mixture of this invention generally will be present in a concentration of 5 to 95 percent by weight, the residue being any one or more of the well known insecticidal adjuvants, such as the surface-active clays, solvents, diluents, carrier media, adhesives, spreading agents, humectants, and the like, but particularly a finely divided solid extender.

There are a large number of organic liquids which can be used for the preparation of solutions, suspensions or emulsions of the mixtures of this invention. For example, isopropyl ether, acetone, methyl ethyl ketone, octanone, dioxane, cyclohexanone, carbon tetrachloride, ethylene dichloride, tetrachloroethane, hexane, heptane and like higher liquid alkanes, hydrogenated naphthalenes, solvent naphtha, benzene, toluene, xylene, petroleum fractions (e.g., those boiling almost entirely under 400° F, and having a flash point above about 80° F, particularly kerosene), mineral oils having an unsulfonatable residue above about 80 percent and preferably above about 90 percent. In those instances wherein there may be concern about the phytotoxicity of the organic liquid extending agent a portion of same can be replaced by such low molecular weight aliphatic hydrocarbons as dipentene, diisobutylene, propylene trimer, and the like or suitable polar organic liquids such as the aliphatic ethers and the aliphatic ketones containing not more than about 10 carbon atoms as exemplified by acetone, methyl ethyl ketone, diisobutyl ketone, dioxane, isopropyl ether, and the like. In certain instances, it is advantageous to employ a mixture of organic liquids as extending agent, e.g., an aromatic hydrocarbon and an aliphatic ketone.

When the mixtures of this invention are to be applied to the larvae or to the environment of the larvae as aerosols, it is convenient to dissolve them in a suitable solvent and disperse the resulting solution in dichlorodifluoromethene or like chlorofluoroalkane which boils below room temperature at atmospheric pressure.

The mixtures of this invention are preferably applied to the larvae or to the environment of the larvae in the form of emulsions or suspensions. Emulsions or suspensions are prepared by dispersing the mixtures of this invention either per se or in the form of an organic solution thereof in water with the aid of a water-soluble non-ionic or anionic surfactant or mixtures thereof. The term "surfactant" as employed here and in the appended claims is used as in Volume II of Schwartz, Perry and Berch's "Surface Active Agents and Detergents" (1958, Interscience Publishers, Inc., New York) in place of the expression "emulsifying agent," to connote generically the various "emulsifying agents," dispersing agents," "wetting agents" and "spreading agents" that are adapted to be admixed with the active mixtures of this invention in order to secure better wetting and spreading of the active ingredients in the water vehicle or carrier in which they are insoluble through lowering the surface tension of the water (see also Frear "Chemistry of Insecticides, Fungicides and Herbicides," second edition, page 280). The surfactants contemplated are the well-known capillary active substances which are non-ionic or anionic and which are described in detail in Volumes I and II of Schwartz, Perry and Berch's "Surface Active Agents and Detergents," (1958, Interscience Publishers, Inc., New York) and also in the November 1947 issue of Chemical Industries (pages 811–824) in an article entitled "Synthetic Detergents" by John W. McCutcheon and also in the July, August, September and October, 1952 issues of Soap and Sanitary Chemicals under the title "Synthetic Detergents." The disclosures of these articles with respect to non-ionizing capillary active substances are incorporated in this specification by reference in order to avoid unnecessary enlargement of this specification. The preferred surfactants are the water soluble anionic and non-ionic surface active agents set forth in U.S. Pat. No. 2,846,398 (issued Aug. 5, 1958).

The mixtures of this invention can be dispersed by suitable methods (e.g., tumbling or grinding) in solid extending agents either of organic or inorganic nature and supplied to the larvae or their environment in particulate form. Such solid materials include for example, tricalcium phosphate, calcium carbonate, kaolin, bole, kieselguhr, talc, bentonite, fuller's earth, pyrophillite, diatomaceous earth, calcined magnesia, volcanic ash, sulfur and the like inorganic solid materials, and include for example, such materials of organic nature as powdered cork, powdered wood, and powdered walnut shells. The preferred solid carriers are the adsorbent clays, e.g., bentonite. These mixtures can be used for insecticidal purposes in the dry form, or by addition of water-soluble anionic or non-ionic surfactants the dry particulate solids can be rendered wettable by water so as to obtain stable aqueous dispersions or suspensions suitable for use as sprays.

For special purposes the mixtures of this invention can be dispersed in a semi-solid extending agent such as petrolatum with or without the aid of solubility promoters and/or surfactants.

In all of the forms described above the dispersions can be provided ready for use in combating the larvae or they can be provided in a concentrated form suitable for mixing with or dispersing in other extending agents. As illustrative of a particularly useful concentrate is an intimate mixture of a mixture of this invention with a water-soluble anionic or non-ionic surfactant or mixtures thereof which lowers the surface tension of water in the weight proportions of 0.1 to 15 parts of surfactant with sufficient of a mixture of this invention to make 100 parts by weight. Such a concentrate is particularly adapted to be made into a spray for combating various forms of Heliothis larvae by the addition of water thereto. As illustrative of such a concentrate is an intimate mixture of 4 parts by weight of 1,1-dichloro-2,2-bis(4'-chlorophenyl) cyclopropane, 16 parts by weight of polychloro camphene characterized by a combined chlorine content of from about 67 percent to about 69 percent by weight, and 2 to 4 parts by weight of a water-soluble non-ionic surfactant such as the polyoxyethylene derivatives of $C_{8-18}$ alkyl substituted phenols such as nonylphenol or dodecylphenol, e.g., isoctylphenol etherified with 10 to 11 mols of ethylene oxide sold under the name of "Triton X–100" as described in Reissue 24,184, July 24, 1956.

Another useful concentrate adapted to be made into a spray for combating Heliothis larvae is a solution (preferably as concentrated as possible) of a mixture of this invention in an organic solvent therefor. The said liquid concentrate preferably contains dissolved therein a minor amount (e.g., 0.5 to 10 percent by weight of the weight of the new insecticidal mixture) of a non-ionic or anionic surfactant or mixtures thereof, which surfactants are also water-soluble. As illustrative of such a concentrate is a solution of one part by weight of 1,1-dichloro-2,2-bis(4'-chlorophenyl) cyclopropane and 4 parts by weight of polychloro camphrene characterized by a combined chlorine content of from about 67 percent to about 69 percent by weight in a petroleum distillate fraction such as kerosene which solution contains dissolved therein a water-soluble non-ionic surfactant such as the polyoxyethylene derivatives of $C_{8-12}$ alkyl substituted phenols such as nonylphenol and dodecylphenol.

In all of the various dispersions described hereinbefore for purposes of combating Heliothis, the active ingredient can be one or more of the mixtures of this invention. Of the mixtures of this invention a particularly economical and efficient one for combating Heliothis species is that having a weight ratio of one part of 1,1-dichloro-2,2-bis(4'-chlorophenyl) cyclopropane per 4 parts of polychloro bicyclic terpene aforedescribed, particularly the aforesaid polychloro camphenes. The mixtures of this invention can also be advantageously employed in combination with other pesticides, including, for example, nematocides bactericides, fungicides, and herbicides as well as other insecticides. In this manner it is possible to obtain mixtures which are effective against a wide variety of pests and other forms of noxious life.

In the combating of Heliothis species the mixtures of this invention either per se or compositions comprising same are applied to the larvae or to their environment in a toxic or insecticidal amount. This can be done by dispersing the new Heliothis insecticidal agent or composition comprising same in, on or over an infested environment or in, on or over an environment the Heliothis adults or larvae frequent, e.g., host plant foliage or other media attractable to the larvae for habitational or sustenance purposes, in any conventional fashion which permits the larvae to be subject contact-wise to the insecticidal action of the mixtures of this invention. Such dispersing can be brought about by applying sprays or particulate solid compositions to a surface infested with the larvae or attractable to the larvae, as for example, habitat media such as the above ground surface of host plants by any of the conventional methods, e.g., power dusters, boom and hand sprayers, and spray dusters.

In a comparative evaluation procedure for evaluating chemical substances for combating Heliothis species infestations, specifically *Heliothis zea* larvae infestations on established cotton plants, it was observed employing aqueous spray dispersions that:

a. at a spraying rate of 0.125 pound per acre 1,1-dichloro-2,2-bis(4'-chlorophenyl) cyclopropane gave a 37 percent larvae kill, while b. at a spraying rate of 3.0 pounds per acre a mixture of 1 part by weight of 1,1,1-trichloro-2,2-bis(4'-chlorophenyl) ethane (which is known as DDT) per 2 parts by weight or polychloro camphene, a waxy solid characterized by a combined chlorine content of 67 percent to 69percent (which weight of chlorine corresponds to about eight atoms of chlorine per mol of polychloro camphene), gave a 76 percent larvae kill, and while c. at a spraying rate of 1.125 pounds per acre a mixture of 1 part by weight of the same polychloro camphene waxy solid as defined in (b) above per 0.125 part by weight of the same 1,1-dichloro-2,2-bis(4'-chlorophenyl) cyclopropane as defined in (a) above gave a 93 percent larvae kill.

In another comparative evaluation procedure for evaluating chemical substances for combating Heliothis species, specifically *Heliothis zea* larvae infestations on established cotton plants, it was observed employing aqueous spray dispersions that substantially equal kills of larvae were obtained employing respectively:

d. at a spraying rate of 0.75 pound per acre the mixture as defined in (b) above, and e. at a spraying rate of 0.3125 pound per acre of a mixture of 0.25 parts by weight of the same polychloro camphene waxy solid as defined in (b) above and 0.0625 parts by weight of the same 1,1-dichloro-2,2-bis(4'-chlorophenyl) cyclopropane as defined in (a) above.

In still another comparative evaluation procedure, wherein below:

Cpd. A is 1,1-dichloro-2,2-bis(4'-chlorophenyl) cyclopropane which is the same compound as defined in (a) hereinbefore, and Cpd. B is polychloro camphene which is the same polychloro camphene waxy solid as defined in (b) hereinbefore, three 4 inch square pots each having two (2) 6- to 8-week old staked cotton plants (Rex smoothleaf variety) growing in light soil (Memphis silt loam), the upper surface of whose leaves were evenly sprayed at a rate in pounds per acre of the material to be evaluated (that is Cpd. A, or Cpd. B, or mixtures of Cpd. A and Cpd. B) as indicated below, wherein the material spray applied is in the form of a dispersion thereof in a mixture of water, inert organic solvent, inert water-soluble alkylarylsulfonate anionic surfactant and inert water-soluble alkylphenol-polyoxyethylene condensate non-ionic surfactant, the volume of spray in each instance being the same. After the deposit had dried (about 2 hours) on each of five individual leaves of each plant was placed one 4-day old healthy *Heliothis zea* larva and individually caged with a transparent plastic cage. Seventy-two hours immediately after this placing of the larva and caging thereof mortality observations were made. The results were as follows:

| Pounds /Acre | Cpd. A | Cpd. B | % Mortality | Weight Ratio of Cpd. A: Cpd. B |
|---|---|---|---|---|
| 0.05 | 0.05 | – | 25 | |
| 0.025 | 0.025 | – | 0 | |
| 0.5 | – | 0.5 | 50 | |
| 0.25 | – | 0.25 | 42 | |
| 0.125 | – | 0.125 | 21 | |
| 0.525 | 0.025 | 0.5 | 50 | 1:20 |
| 0.55 | 0.05 | 0.5 | 70 | 1:10 |
| 0.27 | 0.03 | 0.24 | 72 | 1:8 |
| 0.135 | 0.015 | 0.12 | 35 | 1:8 |
| 0.20 | 0.04 | 0.16 | 67 | 1:4 |
| 0.10 | 0.02 | 0.08 | 56 | 1:4 |
| 0.175 | 0.05 | 0.125 | 70 | 1:2.5 |

While this invention has been described with respect to certain embodiments it is to be understood that it's not so limited for limitations and modifications thereof obvious to those skilled in the art can be made without departing from the spirit or scope of this invention.

What is claimed is:

1. An insecticidal mixture of 1,1-dichloro-2,2-bis(4'-chlorophenyl) cyclopropane and polychloro camphene having a combined chlorine content of from about 67 percent to about 69 percent by weight in a weight ration of one part of the former per 2 to 8 parts, inclusive, of the latter.

2. The mixture of claim 1 wherein the weight ratio of the recited components thereof is one part of the cyclopropane compound per 4 parts of the polychloro camphene compound.

3. A method of combatting insect species of the genus Heliothis which comprises contacting the larval stage thereof with an insecticidal amount of a mixture of 1,1-dichloro-2,2-bis(4'-chlorophenyl) cyclopropane and a polychloro camphene having a a combined chlorine content of from about 67 percent to about 69 percent by weight in a weight ratio of one part of the former per 2 to 8 parts, inclusive, of the latter.

4. The method of claim 3 wherein the weight ratio of the recited components of the insecticidal mixture is one part of the cyclopropane compound per about 2.5 to about 5 parts, inclusive, of the polychloro camphene compound.

5. The method of claim 3 wherein the insect species of Heliothis is *Heliothis zea*.

* * * * *